United States Patent [19]

Engelbrecht et al.

[11] 4,231,974
[45] Nov. 4, 1980

[54] FLUIDS MIXING APPARATUS

[75] Inventors: Horst P. Engelbrecht, Canandaigua; Howard K. Johnson, Webster, both of N.Y.

[73] Assignee: General Signal Corporation, Rochester, N.Y.

[21] Appl. No.: 7,132

[22] Filed: Jan. 29, 1979

[51] Int. Cl.³ .................. B01F 13/02; B03D 1/18; C02F 1/74; C02F 3/20

[52] U.S. Cl. .................... 261/87; 209/170; 210/221 R; 210/221 P; 239/248; 366/103; 261/93

[58] Field of Search .............. 261/87, 93, 64 R; 366/102, 103, 107, 155, 169; 209/168–170; 239/225, 246, 248, 77; 210/219, 220, 221 R, 221 M, 221 P; 416/90 R, 90 A, 231 R, 231 A

[56] References Cited

U.S. PATENT DOCUMENTS

| 21,650 | 10/1858 | Byrne | 416/90 A |
|---|---|---|---|
| 1,580,834 | 4/1926 | McClelland | 261/87 |
| 1,632,758 | 6/1927 | Fulweiler et al. | 261/87 |
| 2,041,184 | 5/1936 | Isenhour | 261/87 |
| 2,121,458 | 6/1938 | Vogelbusch | 261/87 |
| 2,143,441 | 1/1939 | Jacobs | 261/93 |
| 3,092,678 | 6/1963 | Braun | 261/87 |
| 3,123,652 | 3/1964 | Gross | 261/87 |
| 3,560,107 | 2/1971 | Helms | 416/90 R |
| 3,630,498 | 12/1971 | Bielinski | 261/87 |
| 3,775,307 | 11/1973 | McWhirter et al. | 261/87 |
| 3,779,531 | 12/1973 | White | 261/93 |
| 3,867,488 | 2/1975 | Porterfield | 261/87 |
| 3,881,669 | 5/1975 | Lessen | 416/90 R |
| 4,117,048 | 9/1978 | Stockner et al. | 261/87 |
| 4,130,381 | 12/1978 | Levin et al. | 416/231 B |

FOREIGN PATENT DOCUMENTS 1250266 3/1960 France ........................ 261/87

Primary Examiner—Frank W. Lutter
Assistant Examiner—Gregory N. Clements
Attorney, Agent, or Firm—Martin LuKacher; Jeffrey S. Mednick

[57] ABSTRACT

To introduce and mix fluids, particularly gas (air) with liquid, which is called sparging, an airfoil blade impeller is used for pumping the liquid and for introducing the fluid to be sparged into the liquid through holes in the suction surface of the blade. The airfoil blades are characterized by camber, thickness and location of holes which result in high stripping efficiency of the gas into the liquid without significant decrease in power use efficiency over conventional sparging systems.

10 Claims, 6 Drawing Figures

FLUIDS MIXING APPARATUS

The present invention relates to apparatus for mixing fluids and particularly to improved apparatus for mixing a gas into a liquid.

The invention is especially suitable for use in aeration systems to mix oxygen from air with an effluent, as in chemical processing and in sewage or waste water treatment.

The introduction of one fluid, typically air or another gas, into another fluid, typically a liquid, has become known as sparging. Aeration systems, which are generally accepted for use, accomplish sparging through the use of an impeller which pumps the liquid downwardly through a draft tube. The draft tube and impeller are submerged in a tank or other basin containing the liquid. In the draft tube and just below the impeller, there is located a sparge ring which provides for the introduction of air either through holes in the ring or through holes in the sides of vanes which extend radially inward from the ring. The impeller pumps the liquid through the air stream (which is in the form of bubbles). The oxygen in the air is absorbed into the liquid and mixed therewith as the liquid disperses while being pumped downwardly through the draft tube with recirculation around the basin and back into the upper end of the draft tube.

The efficiency of the absorption of gas, in this case oxygen, into liquid is called the stripping efficiency of the system. Stripping efficiency is expressed as the percentage of gas volume absorbed to gas volume introduced. For oxygen the percentage is the ratio of the volume of oxygen absorbed in the liquid to the volume of oxygen which enters the the sparge device. The absorbed oxygen may be measured by a dissolved oxygen probe. The volume of oxygen introduced may be calculated from the amount of oxygen in the volume of input air which is metered by a volumetric flow gauge.

The stripping efficiency of conventional sparging systems ranges from 40–50%, with 51% possible by careful adjustment of impeller speed and air flow. Even with airfoil impellers, such as Model C-100 which is sold by the Mixing Equipment Company, Inc., a unit of General Signal Corporation, Rochester, N.Y., U.S., such stripping efficiencies do not exceed about 50%.

Aeration systems using sparge rings require separate compressors, compressor drives and controls for sparging purposes. It is desirable to eliminate such compressors, drives and controls, since they increase the cost of the systems, and efforts along such lines have been suggested which involve blades of various shapes for sucking air into liquids as they are driven therethrough (see the following U.S. Pat. Nos. 1,097,991; 2,041,184; 3,108,146; 3,630,498; 3,677,528; 3,775,307; and 3,911,064). Mixing blades have also been provided with holes for introduction of fluids (gas and liquids) into the mix (see U.S. Pat. Nos. 536,136; 933,090; 1,580,834; and 2,121,458).

Successful introduction of gas into liquid generally, and aeration in particular, is determined by the stripping efficiency of the system. It has been found, quite surprisingly, that stripping efficiency of about 85% or 60% better than has been achieved in prior practice, is obtained through the use of an airfoil blade impeller having a passage for the gas or other fluid to be introduced into the liquid or other host fluid including holes therein which communicate the fluid with the host fluid while the impeller rotates and pumps the host fluid, where the blades of the impeller have certain relationships of camber, thickness and location of the holes.

It is an object of the invention to provide, in fluid mixing apparatus, an improved axial flow impeller for liquid which provides for the introduction of a fluid (gas or another liquid) into the liquid as it is propelled or pumped by the impeller.

It is another object of the invention to provide an improved draft tube aeration apparatus.

It is a further object of the invention to provide in a mixing system improved sparging apparatus for the efficient introduction (as by absorption of gas into liquid) without substantially diminishing the overall power using efficiency of the mixing system.

It is a still further object of the invention to provide improved sparging apparatus which enables the cost of aerator systems to be reduced (as by eliminating the need for separate compressors, drives and sparge rings) and yet increases stripping efficiency.

It is a still further object of the invention to provide an improved impeller for both propelling and sparging which enables the flow of the gas to be sparged into the liquid to be optimized to minimize drag (viz., interference by the gas with the propelling of the liquid) and yet maintains the flow of enough gas to provide more efficient gas stripping than with conventional systems.

Briefly described the invention provides an apparatus for sparging a fluid (gas or liquid) into a liquid, which apparatus has a shaft which extends into the liquid with an impeller on the shaft, where the shaft and impeller have a passageway for the fluid which extends into communication with the liquid. The impeller has a blade having a cross sectional profile which defines an airfoil. The blade has suction and pressure surfaces on opposite sides thereof with a leading and a trailing edge between which the chord length of the airfoil blade is defined. The blade is cambered and is holed through the suction surface to provide a portion of the passageway for the fluid into communication with the liquid. The blade has the following characteristics: maximum cambe length about 2% to 6% of chord length; location of maximum camber length about 20% to 60% of chord length away from the leading edge; thickness about 10% to 18% of chord length; and location of holes in a region in the suction surface from about 60% to 80% of the chord length from the leading edge (the region being measured between perpendiculars from the chord to the suction surface). The impeller is preferably mounted within a draft tube and coaxial therewith.

The foregoing and other features, objects and advantages of the invention and a presently preferred embodiment thereof will become more apparent from a reading of the following description in connection with the accompanying drawings in which.

Figure 3:
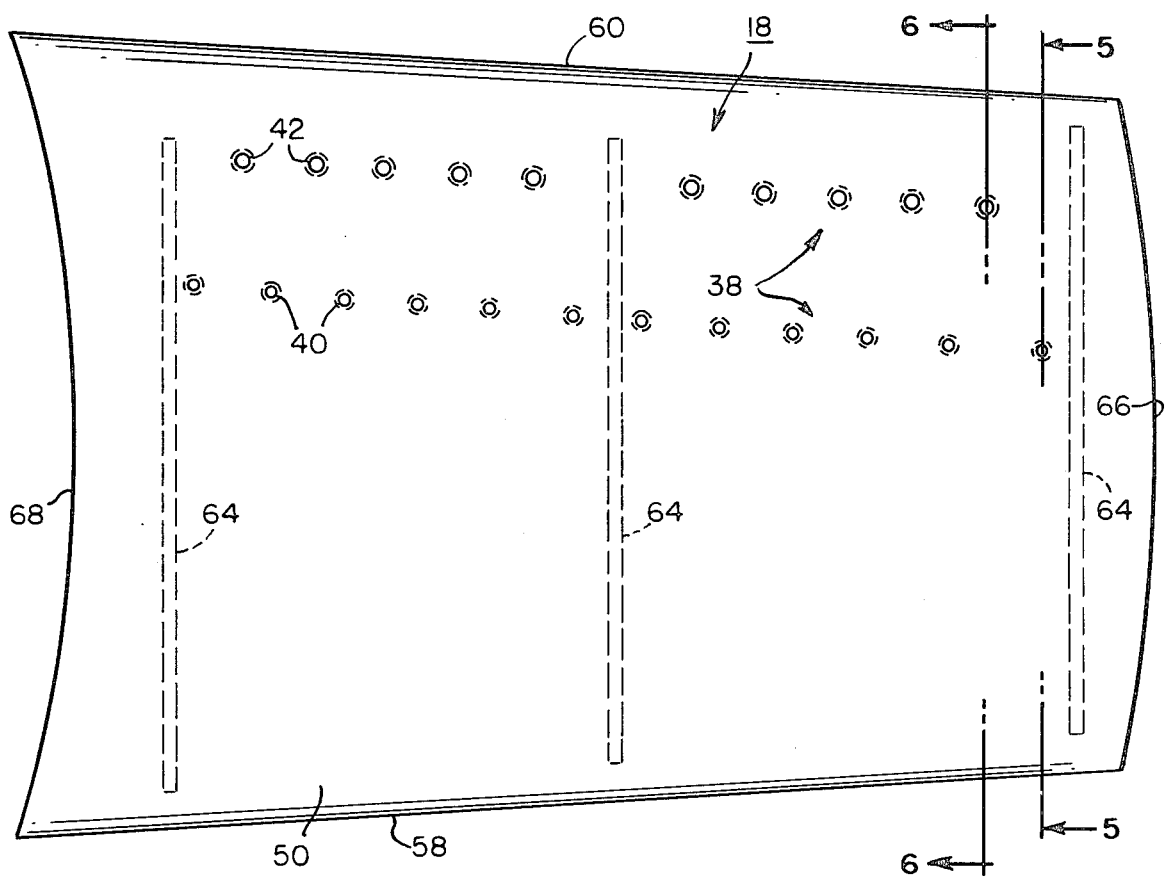
FIG. 3 is a plan view of one of the blades of the impeller of the apparatus shown in FIGS. 1 and 2.
Figure 5:
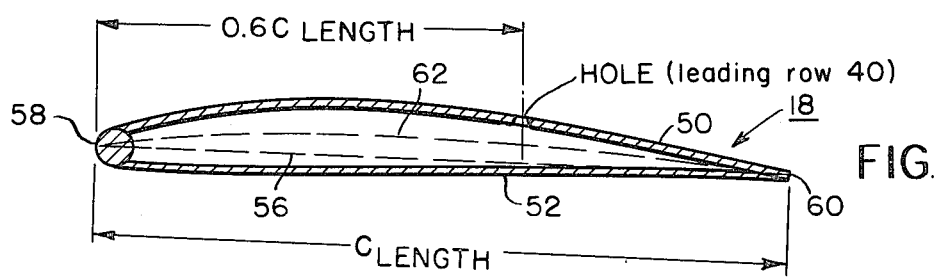
Figure 6:
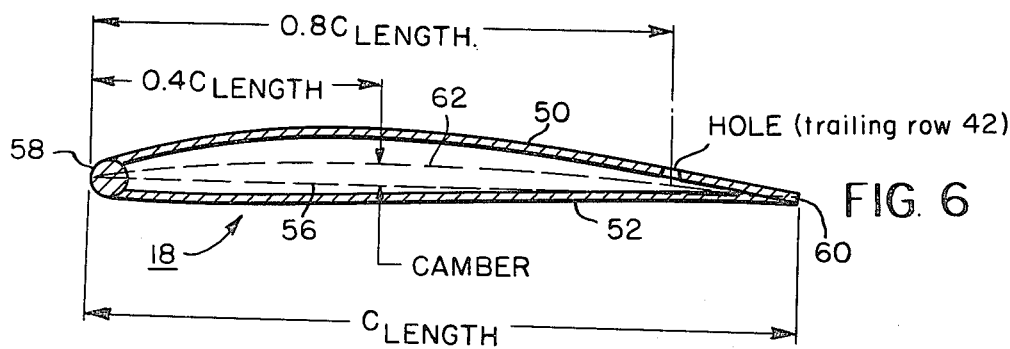

FIGS. 5 and 6 are sectional views of the blade the sections being taken along the lines 5—5 and 6—6 in FIG. 3.

Figure 1:
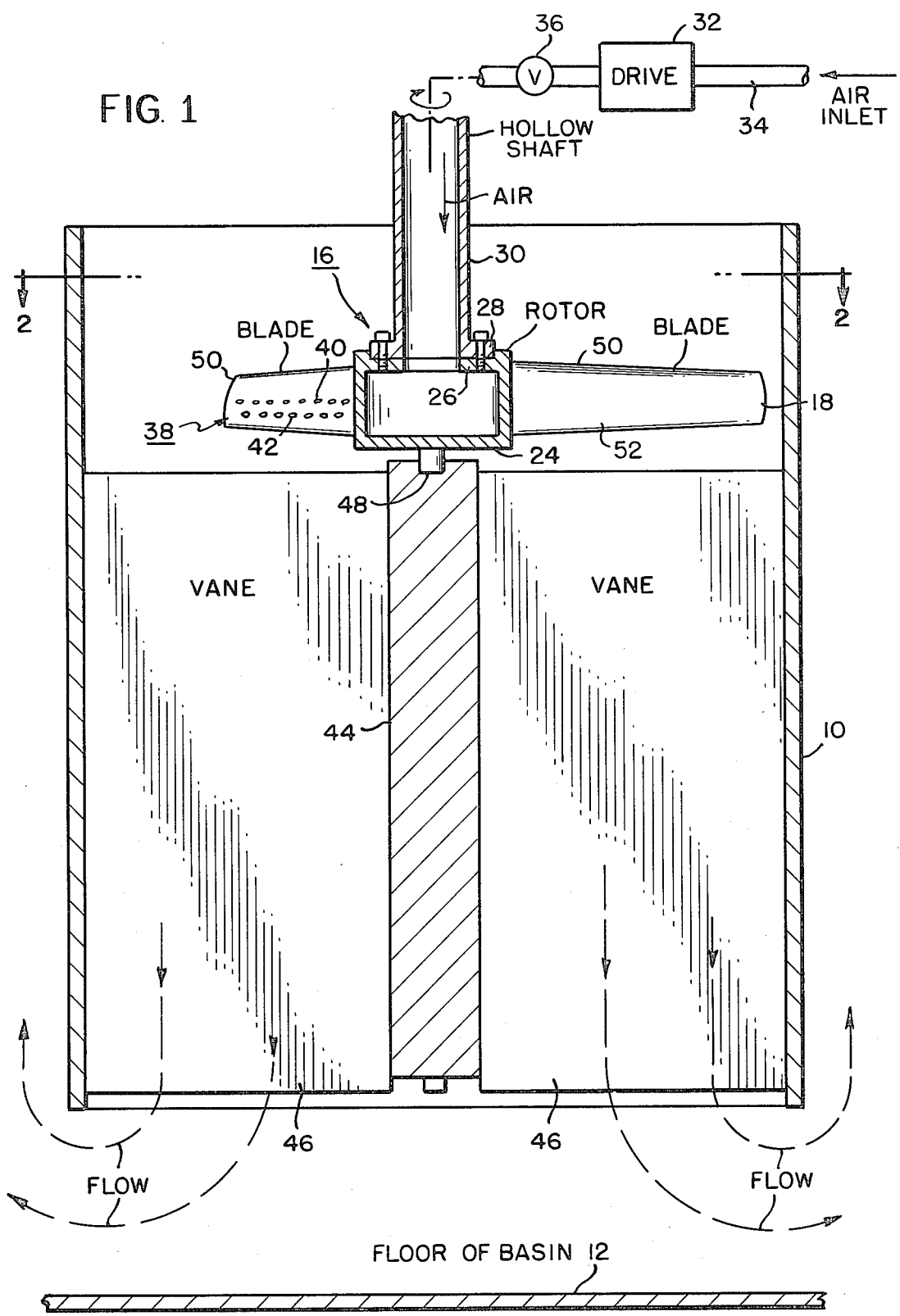
FIG. 1 is a diagrammatic, fragmentary view, partially in section and which shows mixing apparatus for sparging liquid in a basin, in accordance with the invention.
Figure 2:
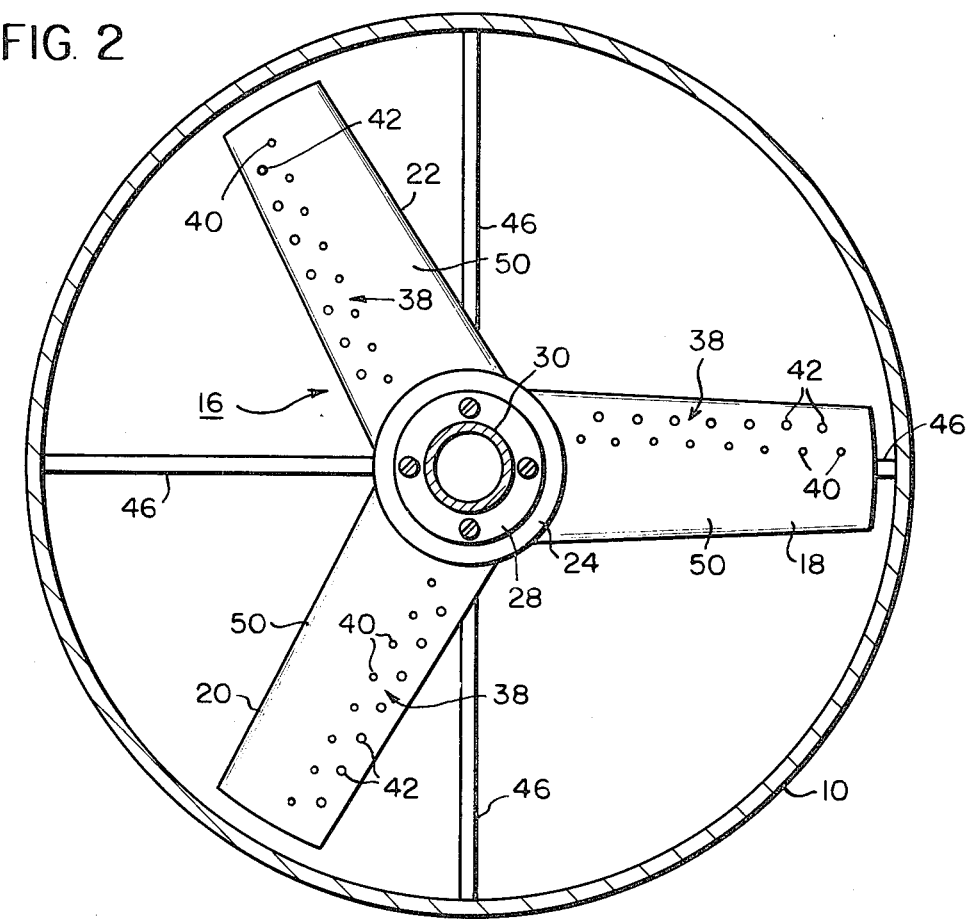
FIG. 2 is a sectional plan view of the apparatus shown in FIG. 1 taken along the line 2—2 in FIG. 1.

The mixing apparatus shown in FIGS. 1 and 2 mixes the oxygen in the air with a liquid effluent and aerates the effluent. The apparatus is known as a draft tube aerator. A draft tube 10 is supported above the floor 12 of a basin, such as a tank, weir, or the like. In operation the draft tube 10 is submerged below the surface of the liquid with sufficient space below the lower end 14 of the tube 10 and the floor 12 of the basin to permit the flow downwardly through the tube 10 to be unrestricted. The tube 10 is disposed with its axis vertical. Support for the tube and the other apparatus may be by a structure suspended over the top of the basin with beams, rods and the like, holding the draft tube and mounting the other elements of the apparatus. Such supporting structure is not shown to simplify the illustration.

The flow of the liquid axially through the tube is maintained by an axial flow impeller 16. The impeller has three blades 18, 20, and 22. In cross-sectional profile these blades define identical airfoils. Additional or fewer blades, even a single blade, may be used. A three-blade impeller 16 is presently preferred.

The blades are mounted, as by welding, to a rotor 24. The rotor 24 is a hollow cylinder, open at the top with a circular flange 26. The flange 28 of a hollow shaft 30 is attached to the rotor flange 26. A seal may be used between the flanges to make the connection airtight. The shaft is rotated by a drive 32. Air from an inlet 34 passes through adjustable rotating orifice plates 36, which are affixed directly to the reducer shaft, (which function and are shown in the drawing as a valve) and into the interior of the hollow shaft 30 by way of a rigid coupling below the drive 32. The drive may consist of an electric motor and gear box with the opening for the air being around the upper portion of the shaft near the drive 32. The blades 18, 20 and 22 of the impeller 16 are hollow (see FIGS. 3 to 6). The blades also have holes 38 arranged in two rows 40 and 42. The number of holes depends upon the volume of air desired, with two rows of holes being presently preferred. The holes provide communication with the liquid through a passageway from the air inlet through the hollow interior of the shaft 30, the hollow interior of the rotor 24 and the hollow interior of the blades.

A hub 44 in the lower end of the tube 10 mounts vanes 46 and provides a limit for lateral deflection of the impeller 16. A boss 48 is received into a blind hole at the top of the hub 44. The boss 48 and the limit ring cooperate to maintain the shaft 30 and the impeller 16 coaxial with the tube 10. The vanes 46 reduce swirling of the liquid as it is propelled and pumped by the impeller through the tube 10.

In operation, the blades rotate at a speed sufficient to pump the liquid through the tube 10 so that it flows out through the lower end 14 of the tube with sufficient velocity to flow throughout the basin and mix thoroughly. A flow pattern is established with some recirculation upwardly around the basin and back into the top of the tube 10. Because of the airfoil shape of the blades 18, 20 and 22 and their orientation, the pressure at the upper surfaces 50 of the blades is less than the pressure at the depth below the surface of the liquid where the blades are located. Air flow is established and streams of bubbles emanate from the holes 38. The liquid is propelled downwardly and mixes with the air emanating from the holes 38 in the blades of the impeller 16. In order to control the amount of air as may be necessary to aerate and impart oxygen to the effluent, the orifice plates 36 may be adjusted as part of the rotating shaft assembly. It will be appreciated that certain effluents, for example, sewage sludge which is to be activated by aerobic bacteria in the effluent requires certain amounts of oxygen depending upon the character of the effluent. Adjustment by means of the rotating orifice plates provides the desired quantity of oxygen. Adjustment of the flow by means of the orifice plates 36 also provides optimum flow of air to minimize drag and maintain sufficient pumping. Because of the stripping efficiency of the apparatus as described above (85% stripping efficiency of oxygen being obtained) enough air is provided to oxygenate the effluent without imparting drag which would retard the rotation of the impeller and require increased power to drive the impeller. Accordingly, efficiencies of power utilization comparable to those obtained with draft tube aerators having sparge rings separate from the impeller thereof, have been obtained.

Referring more particularly to FIGS. 3 through 6, there is shown one of the blades 18 of the impeller 16. The other blades 20 and 22 are identical with the blade 18. The three blades are disposed 120° apart on the rotor 24 (see FIG. 2). Accordingly, the description of one of the blades 18 will suffice for all three of them.

The blade 18 is an airfoil which is defined in accordance with the length of its chord 56. The chord is a straight line drawn between the center of the leading edge 58 and the trailing edge 60 of the blade 18. The center of the leading edge is the intersection of that edge with the midline 62 of the blade 18. Inasmuch as the blade 18 is of the airfoil type, it has a camber. The camber is measured between the chord 56 and the mid line 62 along a perpendicular to the chord 56 (see FIG. 6). The maximum camber which has been found to be critical for a blade having the stripping efficiencies noted above (85%) is about 2% to 6% of the chord length. In a preferred embodiment of the blade the camber is 4%. The location of maximum camber is from about 20% to 60% of the chord length measured along the chord from the leading edge 58 towards the trailing edge 60 of the blade. In a preferred embodiment the maximum camber is located at a point 40% of the chord length from the leading edge 58.

The maximum thickness of the blade measured perpendicular to the mean line between the pressure surface 52 and the suction surface 50 of the blade is in a range from about 10% to 18% of the length of the chord. In a preferred embodiment the maximum thickness is 15% of the chord length. The pressure surface 52 is shown in the drawing as the bottom surface 52 of the blade 18. It is this surface which propels the fluid downwardly through the draft tube 10. The surface shown at the top of the blade is the suction surface 50. Along this surface, the velocity of the liquid with respect to the blade is greatest.

The blade is hollow internally so that the air passageway which communicates with the liquid is through the blade and out of the holes 38. The blade may be fabricated from plates of metal, say stainless steel, and strengthened by struts 64 (see FIG. 3).

The location of the holes 38 has also been found to be important to the air flow and the stripping efficiency of the apparatus. It has been found that the holes should be in a region beyond the point on the suction surface 50 where the relative velocity of the liquid with respect to the blade is greatest, i.e., closer to the trailing edge than the point of maximum thickness of the blade. Th region in which the holes are located should be from about 60% to 80% of the chord length away from the leading edge 58 towards the trailing edge 60. This region is defined between perpendiculars to the chord. In the preferred embodiment shown in the drawings, the two rows of holes 40 and 42 are located such that the leading row 40 is 60% of the chord length from the leading edge 58 and the trailing row 42 is 80% of the chord length from the leading edge 58. These distances are measured between perpendiculars to the chord 56 as shown in FIGS. 5 and 6. The holes 38 themselves are tapered inwardly towards the suction surface 50 and define nozzles. This nozzle configuration of the holes 38 promotes the separation of the bubbles of air from the blade as the blade travels through the liquid.

Figure 4:
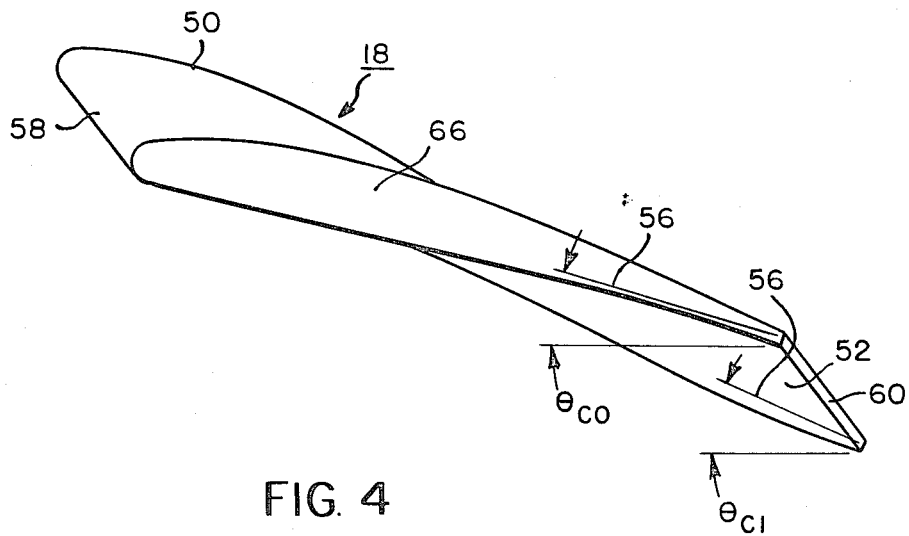
FIG. 4 is an end view of the blade shown in FIG. 3.

The blade is slightly tapered, as shown in FIG. 3. The free end or tip 66 of the blade is narrower than the end 68 which is attached to the rotor 24 (see FIGS. 1 and 2). The blade 18 is also twisted as shown in FIG. 4. The chord angle $\theta_c$, which is the angle between the chord 56 and the horizontal, decreases in a direction radially outward of the blade. The chord angle $\theta_{co}$ at the outer end or tip 66 of the blade is smaller than the cord angle $\theta_{ci}$ at the inner end of the blade (see FIG. 4). The chord angle is selected depending upon the desired pumping rate of the fluid so as to maintain uniform velocity of the impelled fluid in the tube 10.

The pressure difference along the suction surface 50 decreases from the point of maximum thickness of the blade toward the trailing edge. In order to provide for uniform flow of air through the holes 38, the trailing row of holes 42 is desirably made of larger diameter than the holes in the leading row 40. It may also be desirable in the interest of uniform flow of gas into the liquid to vary the diameter of the holes. In such case the larger diameter holes are located closer to the rotor. The hole diameters would decrease linearly in proportion to the radius of the blade as measured between the tip 66 and the axis of the rotor along the hole row. The velocity of the fluid with respect to the blade changes with the radius and the pressure at the suction surface varies with the square of the relative velocity. Inasmuch as the area of the holes varies with the square of the diameter thereof, the hole size may decrease linearly with increasing radial distance from the center of the rotor 24.

The theoretical basis for the increase in stripping efficiency is not presently understood. It has been found however that an impeller of the airfoil type which is designed to have the camber thickness and hole location in accordance with the invention provides the high stripping efficiency as well as the other features and advantages described above.

We claim:

1. In apparatus for introducing a first fluid into a second fluid, said apparatus having a shaft which extends into said second fluid, an impeller on said shaft, said shaft and impeller having a passageway for said first fluid which extends through said shaft and said impeller into communication with said second fluid, the improvement which comprises a pumping impeller comprising a blade having a cross-sectional profile which defines an airfoil with a suction surface and a pressure surface on opposite sides thereof, said airfoil blade having a camber, a leading edge and a trailing edge which defines a chord therebetween, said camber having a maximum length in the range of about 2% to 6% of the length of said chord, the location of said maximum camber length being measured between the midline of said blade and said chord along a perpendicular to said chord in a region measured along said chord a distance of in a range about 20% to 60% away from said leading edge toward said trailing edge, the maximum thickness of said blade between said pressure and suction surfaces being in a range from about 10% to 18% of the length of said chord, and the portion of said fluid passageway in said impeller comprising a hole, extending through said suction surface in and only in a region of said suction surface located between perpendiculars from said chord to said suction surface in a range from about 60% to 80% of the length of said chord along said chord from said leading edge toward said trailing edge, the axis of said hole being perpendicular to said suction surface.

2. The improvement as set forth in claim 1 further comprising a draft tube in said second fluid around said shaft and impeller and coaxial therewith, said tube having an axial length such that one end of said tube extends beyond said impeller into said second fluid, said pressure surface of said blade facing said one end such that said impeller pumps said second fluid in a direction toward said one end of said tube.

3. The improvement as set forth in claim 2 wherein said apparatus is adapted to be disposed in a basin, said second fluid is a liquid in said basin, said shaft extends vertically into said liquid from the surface thereof, said tube being submerged in said liquid, one end of said tube being spaced from the floor of said basin, and said impeller pumps said liquid downwardly through said tube to distribute said liquid with said first fluid in said basin.

4. The improvement as set forth in claim 1 wherein a plurality of holes in said suction surface region are provided.

5. The improvement as set forth in claim 4 wherein said plurality of holes are arranged in a plurality of rows of holes which extend radially outward along said suction surface, a first of said rows being closer to said leading edge than a second of said rows, said holes in said first row being smaller than the holes in said second row.

6. The improvement as set forth in claim 5 wherein said holes in said first row are located along perpendiculars to said chord at about 60% of the length of said chord from said leading edge, and said holes in said second row are located along perpendiculars to said chord at about 80% of the length of said chord from said leading edge.

7. The improvement as set forth in claim 4 wherein said holes are tapered inwardly in a direction toward and to said suction surface to define nozzles.

8. The improvement as set forth in claim 1 wherein said first fluid is a gas, such as air, and said second fluid is a liquid, and valve means connected to said passageway for variably controlling the flow of said gas as it is sparged into said liquid.

9. The improvement as set forth in claim 1 wherein said maximum camber is about 4% of the length of said chord, said maximum camber is located along a perpendicular to said chord about 40% of the length of said chord from said leading edge, said thickness of said blade is about 15% of the length of said chord, and said portion of said fluid passage in said impeller consists of at least two rows of holes which extend radially outwardly along said suction surface, the holes in one of said rows being located along perpendiculars to said chord at about 60% of the length of said chord from said leading edge, the holes in another of said rows being located along perpendiculars to said chord at about 80% of the length of said chord from said leading edge, said holes in said one row being smaller in diameter than the holes in said other row.

10. The invention as set forth in claim 1 wherein said blade has a chord angle between said chord and the horizontal which decreases in a radially outward direction, such that said blade has a twisted configuration.

* * * * *